United States Patent
Bilik et al.

(10) Patent No.: US 10,444,341 B2
(45) Date of Patent: Oct. 15, 2019

(54) ROAD CLUTTER MITIGATION

(71) Applicant: GM GLOBAL TECHNOLOGY OPERATIONS LLC, Detroit, MI (US)

(72) Inventors: Igal Bilik, Rehovot (IL); Shahar Villeval, Tel Aviv (IL); Shmuel Nedjar, Modiin (IL); Alexander Pokrass, Bat Yam (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 289 days.

(21) Appl. No.: 15/450,532

(22) Filed: Mar. 6, 2017

(65) Prior Publication Data

US 2018/0252803 A1 Sep. 6, 2018

(51) Int. Cl.
| | |
|---|---|
| *G01S 13/70* | (2006.01) |
| *G01S 7/40* | (2006.01) |
| *G01S 13/93* | (2006.01) |
| *G01S 7/41* | (2006.01) |
| *G01S 13/66* | (2006.01) |

(52) U.S. Cl.
CPC ............ *G01S 13/70* (2013.01); *G01S 7/4004* (2013.01); *G01S 7/414* (2013.01); *G01S 13/931* (2013.01); *G01S 13/66* (2013.01); *G01S 2013/9375* (2013.01)

(58) Field of Classification Search
CPC ...... G01S 13/931; G01S 7/292; G01S 7/2922; G01S 7/2923; G01S 7/2927; G01S 7/40; G01S 7/4004; G01S 7/4008; G01S 7/4021; G01S 7/4026; G01S 7/414; G01S 13/66

See application file for complete search history.

(56) References Cited

U.S. PATENT DOCUMENTS

| | | | | |
|---|---|---|---|---|
| 4,107,678 | A * | 8/1978 | Powell | F41G 7/2266 244/3.19 |
| 5,949,368 | A * | 9/1999 | DeCesare | G01S 7/2927 342/159 |
| 6,124,823 | A * | 9/2000 | Tokoro | G01S 7/2927 342/128 |
| 6,476,760 | B1 * | 11/2002 | Winter | G01S 7/4026 342/104 |
| 6,642,839 | B1 * | 11/2003 | Gunderson | G01S 13/931 340/435 |
| 2005/0073433 | A1 * | 4/2005 | Gunderson | B60Q 9/006 340/903 |
| 2005/0180530 | A1 * | 8/2005 | Reiche | G01S 7/52004 375/317 |
| 2005/0237236 | A1 * | 10/2005 | Budic | G01S 7/414 342/159 |
| 2008/0111733 | A1 * | 5/2008 | Spyropulos | G01S 7/412 342/189 |

(Continued)

*Primary Examiner* — Peter M Bythrow
(74) *Attorney, Agent, or Firm* — Cantor Colburn LLP

(57) ABSTRACT

A method and radar system and vehicle that tracks an object is disclosed. A source signal is transmitted into a volume that includes the object. A reflected signal is received from the volume in response to the source signal. The reflected signal includes a reflection of the source signal from the object. A range is determined for the object from the reflected signal. A ground signal is estimated at the determined range and an amount of the ground signal in the reflected signal is estimated. The object is selected for tracking based on the estimate of the amount of the ground signal in the reflection from the object.

20 Claims, 4 Drawing Sheets

(56) References Cited

U.S. PATENT DOCUMENTS

| | | | | |
|---|---|---|---|---|
| 2009/0135046 A1* | 5/2009 | Steele | G01S 7/414 | 342/27 |
| 2011/0133979 A1* | 6/2011 | Huizing | G01S 7/414 | 342/29 |
| 2011/0156955 A1* | 6/2011 | Jeong | G01S 13/931 | 342/359 |
| 2012/0050093 A1* | 3/2012 | Heilmann | G01S 7/4004 | 342/173 |
| 2013/0038484 A1* | 2/2013 | Ohkado | G01S 13/345 | 342/70 |
| 2013/0063299 A1* | 3/2013 | Proudkii | G01S 7/024 | 342/188 |
| 2013/0093614 A1* | 4/2013 | Tokoro | G01S 13/34 | 342/109 |
| 2013/0201054 A1* | 8/2013 | Wang | G01S 13/0218 | 342/93 |
| 2014/0062762 A1* | 3/2014 | Kurono | G01S 7/354 | 342/146 |
| 2015/0338508 A1* | 11/2015 | Chabaud | G01S 7/4004 | 342/173 |
| 2016/0041260 A1* | 2/2016 | Cao | G01S 7/282 | 342/129 |
| 2016/0161597 A1* | 6/2016 | Treptow | G01S 7/4026 | 342/174 |
| 2016/0170020 A1* | 6/2016 | Hamada | G01S 13/66 | 342/70 |
| 2017/0187102 A1* | 6/2017 | Abe | G01S 13/931 | |

* cited by examiner

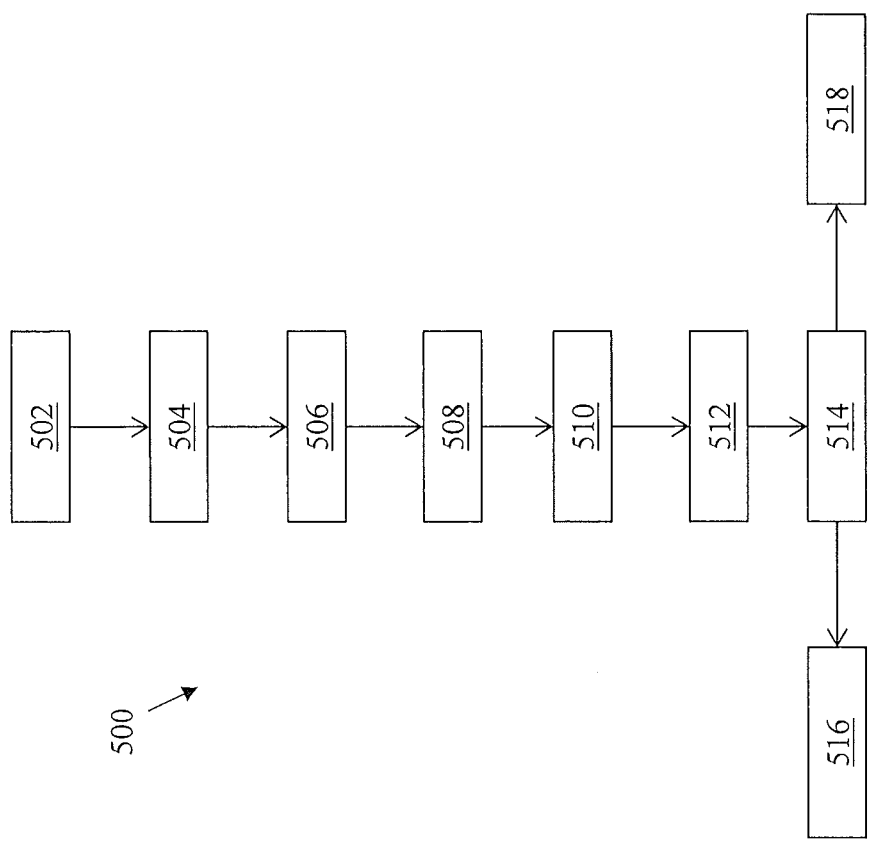

ROAD CLUTTER MITIGATION

INTRODUCTION

The subject disclosure relates to radar systems and in particular, to a system and method of mitigating the effects of ground reflections in radar signals.

Tracking systems for vehicles include one or more radar systems which are able to determine parameters such as the ranges of various objects relative to the vehicle and the velocities of the objects relative to the vehicle. The tracking system can use these parameters to alert the driver of the objects, or to operate an autonomous driving system of the vehicle to perform maneuvers that avoid interference with the objects. A radar system includes a transmitter that transmits a source signal, generally a radio frequency signal into a volume of space that includes the objects, and a receiver that receives reflected signals (reflections of the source signal) from the objects. Due to the location of the radar system on the vehicle, a significant portion of the source signal is reflected off of the ground and can obscure reflections from the objects, thereby affecting a reliability of the tracking system. Accordingly, it is desirable to provide a method for determining the effect of ground signals in a reflection signal received at a radar system.

SUMMARY

In one exemplary embodiment, a method of tracking an object is disclosed. The method includes transmitting a source signal into a volume that includes the object and receiving a reflected signal from the volume in response to the source signal, wherein the reflected signal includes a reflection of the source signal from the object. A range for the object is determined from the reflected signal, and a ground signal is estimated at the determined range. Thus, an amount of the ground signal in the reflected signal is estimated. The object is selected for tracking based on the estimate of the amount of the ground signal in the reflection from the object.

Estimating the amount of ground signal in the reflected signal may include forming a ratio that compares the ground signal at the determined range to a total reflected signal at the determined range. Forming the ratio may include correlating the ground signal at the determined range with the reflected signal at the determined range of the object to obtain a correlation value, determining a total power at the determined range, and forming the ratio of the correlation value at the determined range to the total power at the determined range. In an embodiment, the reflection from the object is disregarded when the ratio is greater than a selected noise threshold. The object may be tracked when the ratio is less than a selected noise threshold. A vehicle may be maneuvered with respect to the object based on a parameter of the tracked object.

In an embodiment in which the ground signal is a calibration ground signal obtained by transmitting the source signal into a calibration volume that provides only ground reflections, the processor estimates the ground signal by selecting the calibration ground signal for the range of the object.

In another exemplary embodiment, a motor vehicle radar system for tracking an object is disclosed. The radar system includes a transmitter for transmitting a source signal into a volume which contains the object, a receiver for receiving a reflected signal from the volume in response to the source signal, wherein the reflected signal includes a reflection of the source signal from the object, and a processor. The processor is configured to determine a range for the object from the reflected signal, estimate a ground signal for the determined range of the object, estimate an amount of the ground signal in the reflection from the object, and select the object for tracking the object based on the estimated amount of the ground signal in the reflection from the object.

The processor is further configured to form a ratio of the ground signal at the determined range to a total reflected signal at the determined range. In forming the ratio, the processor correlates the ground signal at the determined range with the reflected signal at the determined range of the object to obtain a correlation value, determines a total power at the determined range, and forms the ratio of the correlation value at the determined range to the total power at the determined range. The processor may further disregard the signal as noise when the ratio is greater than a selected noise threshold. The processor may track the object when the ratio is less than a selected noise threshold. The processor may maneuver a vehicle with respect to the object based on a parameter of the tracked object.

In an embodiment, the ground signal is a calibration ground signal obtained by transmitting the source signal into a calibration volume that includes only a ground reflection and the processor estimates the ground signal by selecting the calibration ground signal at the range of the object.

In yet another exemplary embodiment, a vehicle is disclosed. The vehicle includes a transmitter for transmitting a source signal into a volume which contains an object, a receiver for receiving a reflected signal from the volume in response to the source signal, wherein the reflected signal includes a reflection of the source signal from the object, and a processor. The processor determines a range for the object from the reflected signal, estimates a ground signal for the determined range of the object, estimates an amount of the ground signal in the reflection from the object, and selects the object for tracking based on the estimated amount of the ground signal in the reflection from the object.

In an embodiment, the processor forms a ratio of the ground signal at the determined range to a total reflected signal at the determined range. Forming the ratio includes correlating the ground signal at the determined range with the reflected signal at the determined range of the object to obtain a correlation value, determining a total power at the determined range, and forming the ratio of the correlation value at the determined range to the total power at the determined range. In an embodiment, the processor disregards the reflection from the object as noise when the ratio is greater than a selected noise threshold. The processor may further track the object when the ratio is less than a selected noise threshold.

In an embodiment, the vehicle includes an autonomous driving system that receives the tracking of the object from the processor and maneuvers the vehicle with respect to the tracked object based on a parameter of the object determined from the reflected signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 shows a flowchart that illustrates the method disclosed herein for tracking an object in an environment that includes a ground signal.

DETAILED DESCRIPTION

Figure 1:
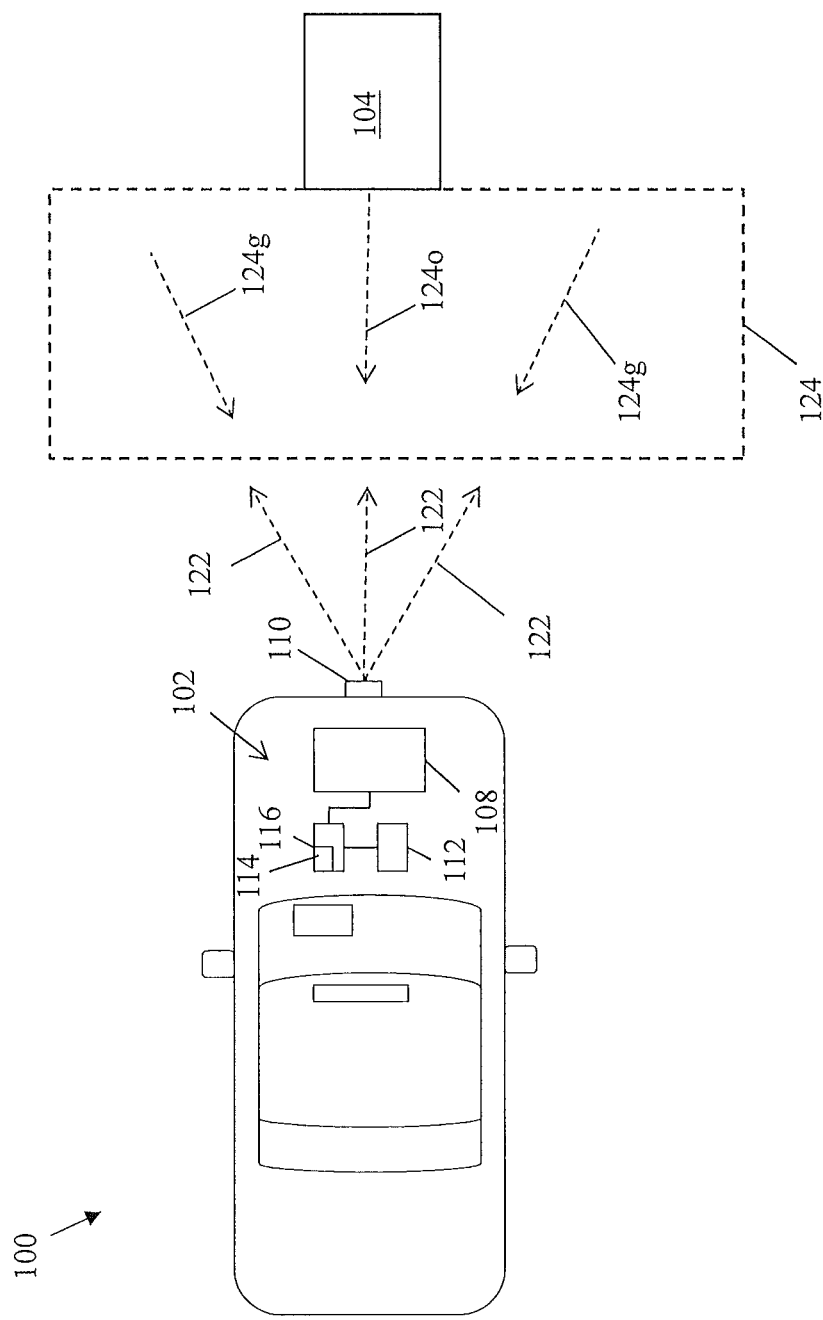
FIG. 1 shows a vehicle having an autonomous driving system suitable for enhancing a safe driving of the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, FIG. 1 shows a vehicle 100 having an autonomous driving system 102 suitable for enhancing a safe driving of the vehicle 100. In an embodiment, the autonomous driving system 102 can be used to provide a signal to a driver of the vehicle 100 in order to alert the driver to one or more objects in the environment of the vehicle 100. In another embodiment, the autonomous driving system 102 can cause the vehicle 100 to respond to the one or more objects without waiting for a response from the driver or without alerting the driver.

The autonomous driving system 102 includes a radar system 108, a control unit 116 and a collision-avoidance system 112. The radar system 108 operates one or more radar transducers at various locations on the vehicle 100; such as transducer 110 located at a front of the vehicle 100, e.g, on a front bumper. Other exemplary transducer locations may include a rear of the vehicle 100 such on a rear bumper, or a side of the vehicle such as a side mirror thereof. Transducer 110 includes a transmitter and receiver. The transmitter of transducer 110 transmits a source signal 122 into a volume in front of the vehicle 100 in which object 104 resides. The object 104 may include an exemplary object of concern to a driver of a vehicle 100, such as a tree, a vehicle, a pedestrian, a light post, etc. The object 104 may be stationary or in motion. The source signal 122 travels into the volume over a selected angular range. The reflection of the source signal 122 off of elements in the volume is received at the receiver as reflected signal 124. The reflected signal 124 may include various reflections signals. The object 104 reflects the source signal 122 in the form of a reflection 124o. Some of the reflected signal 214 is due to reflection of the source signal 122 from the ground, also referred to herein as a ground signal 124g. Thus, at any range of the object 104, some of the reflected signal 124 is due to a reflection 124o from the object 104 and some of the reflected signal 124 is a ground signal 124g.

The radar system 108 controls the operation of the transducer 110 and obtains radar measurement data of the object 104. The radar measurement data may include an intensity, frequency, etc. of the source signal 122 and an intensity, frequency, etc. of the reflected signal 124. The radar system 108 provides the radar measurement data to the control unit 116.

The control unit 116 may include one or more processors 114 for determining a location and/or velocity (i.e., Doppler frequency) of the object 104 from the radar measurement data. In addition, the control unit 116 can perform the methods disclosed herein for mitigating the effect of ground signal 124g in the reflected signal 124. Depending on the relative strength of the ground signal in the reflected signal 124, the processor 114 can decide that the reflected signal 124 is either indistinguishable from a ground signal 124g or that the reflected signal 124 represents an object 104 that the control unit 116 will want to track. When the reflected signal 124 is determined to represent an object 104 for tracking, the control unit 116 can provide the location and/or velocity of the object 104 to the collision-avoidance system 112.

The collision-avoidance system 112 obtains inputs (e.g., speed, braking rate, acceleration) of the vehicle 110 from internal components and other sensors of the vehicle 100 and uses this information along with the determined location and/or velocity of the object 104 in order to determine a path that avoids contact with the object 104. The collision-avoidance system 112 may provide an alert to a driver when the object 104 provides a hazardous situation for the vehicle 100. Alternatively, the collision-avoidance system 112 can maneuver the vehicle 100 along the determined path by performing one or more of altering a velocity of the vehicle 100, altering a driving direction of the vehicle, etc. In this manner, the collision-avoidance system 112 provides the ability of the vehicle 100 to drive safely through its environment without interacting with the object 104.

Figure 2:
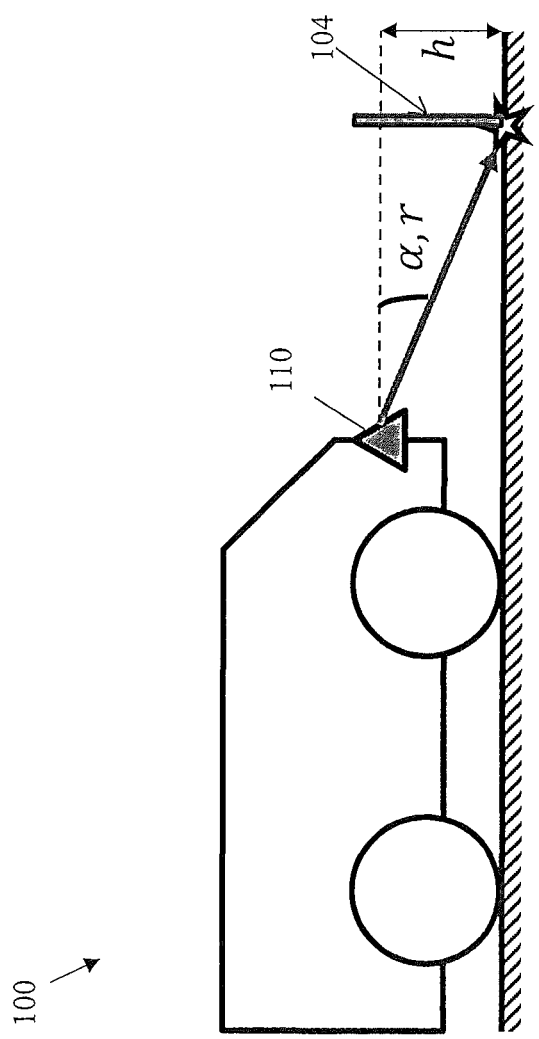
FIG. 2 shows a side view of the vehicle and radar transducer located on the front bumper of the vehicle.

FIG. 2 shows a side view of the vehicle 100 and radar transducer 110 located on the front bumper of the vehicle. The transducer 110 is at a selected height h above the ground and detects object 104 at range r from the transducer 110. Given the height h of the transducer 110 and the range r to the object 104, an elevation angle α for the object 104 can be determined. Reflected signals that are received at range r from an elevation or altitude below elevation angle α are reflections from the ground. Reflected signals that are received at range r from an elevation or altitude above elevation angle α can be considered to be reflections from the object 104.

The method disclosed herein compares a signal reflection from the object at a selected range of the object to a ground signal at the selected range in order to determine whether a received reflected signal represents an object for tracking. The ground signal is provided during a calibration stage by storing a calibration ground signal in a memory of the control unit 116 and accessing the calibration ground signal at an appropriate time. To obtain a calibration ground signal, the transducer 110 is placed in an open environment having no objects. The transducer 110 is placed at a height h corresponding to the height at which the transducer 110 is disposed on the vehicle 100. In such an open environment, the signals received at the transducer 110 are due solely to reflection from the ground, i.e., a calibration ground signal. The calibration ground signal is stored in memory. In an embodiment, the calibration ground signal is stored as a frequency spectrum in k-space by, for example, performing a Fast Fourier Transform (FFT) on the received calibration ground signal. The memory can store additional ground signals for a plurality of transducer frequencies, transducer heights, etc.

Figure 3:
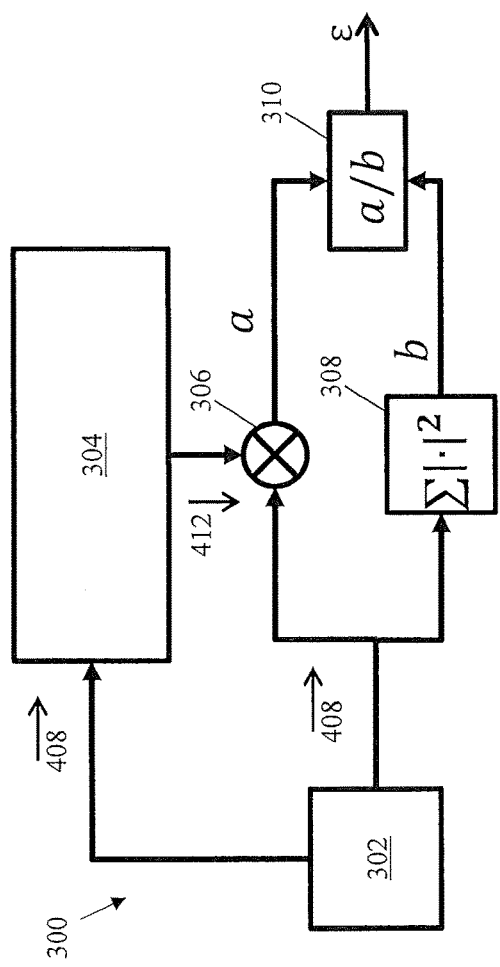
FIG. 3 shows a schematic diagram that illustrates a method for determining an amount of ground signal in a reflected signal.

FIG. 3 shows a schematic diagram 300 that illustrates a method for determining an amount of ground signal in a reflected signal. The method can be performed by a processor such as processor 114 of the control unit 116. Diagram 300 includes a detector 302 that obtains radar reflection signals, and a memory device 304. The detector 302 receives a reflected signal from a volume proximate the vehicle 100 by transmitting a source signal into the volume and receiving in response a reflected signal. For illustrative purposes, the volume includes a single object. Therefore, the plurality of reflections comes from the object as well as from the ground. The reflected signal is used to determine a range of the object. In various methods, a Fast Fourier Transform (FFT) is performed on the reflected signal in order to obtain a frequency spectrum in k-space.

Figure 4:
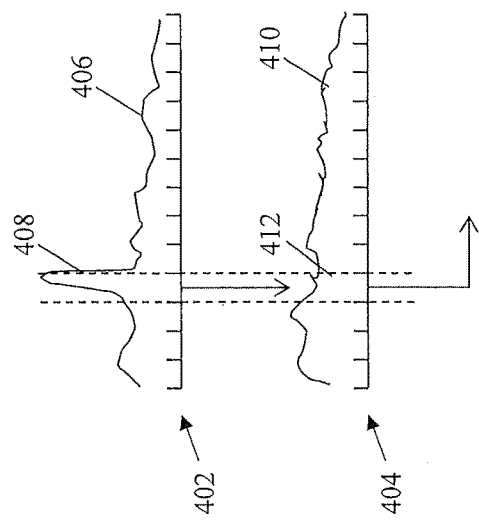
FIG. 4 shows spectra for a reflected signal and for a calibration ground signal in an embodiment.

FIG. 4 shows spectra for a reflected signal and for a calibration ground signal in an embodiment. K-space 402 displays a spectrum 406 for the reflected signal. Spectrum 406 includes a frequency peak 408. Some of spectrum 406 may be a result of ground signals. The location of the frequency peak 408 corresponds to the range of the object 104. K-space 404 displays a spectrum 410 of the calibration ground signal obtained during the calibration stage. Each k-space 402 and 404 includes multiple frequency range bins. The size of the frequency range bin is equal for each of k-space 402 and k-space 404 because the same frequency is used during calibration as for tracking. The range bin of k-space 402 that includes the frequency peak 408 is identified and provided to the memory device 304 which stores k-space 404. At k-space 404, the portion 412 of the spectrum 410 within the identified range bin is selected for further computations. The portion 412 of spectrum 410 within the identified range bin provides an intensity of the ground signal at the selected range of the object 104.

Returning to FIG. 3, the ground signal at the selected range is correlated with the reflection signal from the object at the selected range using a correlation function 306. In particular, a correlation function 306 is calculated that includes the portion 412 of spectrum 410 and the portion of spectrum 406 within the identified frequency bin. This correlation function 306 provides a correlation value 'a' at the range of the object 104. The reflected signal at the range of the object is then used to create a total power 'b' for the range of the object. The total power for the range may include a power for the identified frequency bin in k-space 402. A ratio a/b is formed from the correlation value at the range and the total power at the range. The ratio a/b provides a measure of an amount of ground signal in the reflection at the range of the object. The ratio a/b is compared to a selected noise threshold value ε in order to select a course of action with respect to the reflected signal. If ratio a/b is greater than the selected noise threshold value, the received signal is considered to be in large part due to a ground signal. Such signals are of little interest for tracking. Therefore, if a/b>=ε, the processor 114 can select to ignore the signal. However, if a/b<ε, the processor 114 can determine that the signal corresponds to the object 104. The processor 114 can then select to perform or initiate a tracking operation on the object 104.

Once the object 104 is tracked, parameters of the object, such as range, Doppler frequency, relative velocity, etc. can be provided to the collision avoidance system 112 in order for the vehicle 110 to maneuver safely with respect thereto. In various embodiments, the decision making process (i.e., comparison of ratio a/b to noise threshold value ε), allows the processor 114 as well as the collision avoidance system 112 to ignore ground signals, thereby freeing up resources that would otherwise be spent on tracking ground signals that are of relatively little interest.

FIG. 5 shows a flowchart 500 that illustrates the method disclosed herein for tracking an object in an environment that includes a ground signal. In box 502, a reflected signal is obtained from a volume of space that includes the object. In box 504, a range of the object is determined from the reflected signal. In box 506, a calibration ground signal is obtained that corresponds to the range of the object. In box 508, the calibration ground signal at the range of the object is correlated to the reflection obtained from the object to obtain a correlation value at the range of the object. In box 510, a total power at the range of the object is determined. In box 512, a ratio of the correlation value at the range to the total power at the range is formed. In box 514, the ratio is compared to a selected noise threshold value. In box 516, if the ratio is greater than or equal to the noise threshold value, the signal is ignored as being only ground signal. In box 518, if the ratio is less than the noise threshold value, the signal is considered to represent the object and the object is tracked.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of tracking an object, comprising:
transmitting a source signal into a volume that includes the object;
receiving a reflected signal from the volume in response to the source signal, wherein the reflected signal includes a reflection of the source signal from the object;
determining a selected frequency at which a peak occurs in a frequency spectrum of the reflection signal;
determining a ground signal intensity at the selected frequency from a ground signal spectrum stored in memory;
estimating, from the ground signal intensity and the peak in the frequency spectrum, an amount of the ground signal in the reflected signal at a range corresponding to the selected frequency; and
identifying the object at the range for tracking when the amount is less than a selected noise threshold.

2. The method of claim 1, wherein estimating the amount of the ground signal in the reflected signal further comprises forming a ratio that compares the ground signal at the determined range to total reflected signal at the determined range.

3. The method of claim 2, wherein forming the ratio further comprises:
correlating the ground signal at the selected frequency with the peak at the selected frequency of the object to obtain a correlation value;
determining a total power at the selected frequency; and
forming the ratio by comparing the correlation value at the selected frequency to the total power at the selected frequency.

4. The method of claim 3, further comprising disregarding the reflection from the object when the ratio is greater than a selected noise threshold.

5. The method of claim 3, further comprising tracking the object when the ratio is less than a selected noise threshold.

6. The method of claim 5, further comprising maneuvering a vehicle with respect to the object based on a parameter of the tracked object.

7. The method of claim 1, wherein the ground signal is a calibration ground signal obtained by transmitting the source signal into a calibration volume that provides only ground reflections, wherein the processor estimates the ground signal by selecting the calibration ground signal for the range of the object.

8. A motor vehicle radar system for tracking an object, comprising:
a transmitter for transmitting a source signal into a volume which contains the object;
a receiver for receiving a reflected signal from the volume in response to the source signal, wherein the reflected signal includes a reflection of the source signal from the object; and
a processor configured to:
determine a selected frequency at which a peak occurs in a frequency spectrum of the reflection signal;
determine a ground signal intensity at the selected frequency from a ground signal spectrum stored in memory;
estimate, from the ground signal intensity and the peak in the frequency spectrum, an amount of the ground signal in the reflection from the object at a range corresponding to the selected frequency, and
identify the object at the ragne for tracking the object when the amount is less than a selected noise threshold.

9. The radar system of claim 8, wherein the processor is further configured to form a ratio of the ground signal at the determined range to a total reflected signal at the determined range.

10. The radar system of claim 9, wherein forming the ratio further comprises:
correlating the ground signal at the selected frequency with the peak of the reflected signal at the selected frequency to obtain a correlation value;
determining a total power at the selected frequency; and
forming the ratio by comparing the correlation value at the selected frequency to the total power at the selected frequency.

11. The radar system of claim 10, wherein the processor is further configured to disregard the signal as noise when the ratio is greater than a selected noise threshold.

12. The radar system of claim 10, wherein the processor is further configured to track the object when the ratio is less than a selected noise threshold.

13. The radar system of claim 12, wherein the processor is further configured to maneuver a vehicle with respect to the object based on a parameter of the tracked object.

14. The radar system of claim 8, wherein the ground signal is a calibration ground signal obtained by transmitting the source signal into a calibration volume that includes only a ground, wherein the processor estimates the ground signal by selecting the calibration ground signal at the range of the object.

15. A vehicle, comprising:
a transmitter for transmitting a source signal into a volume which contains an object;
a receiver for receiving a reflected signal from the volume in response to the source signal, wherein the reflected signal includes a reflection of the source signal from the object; and
a processor configured to:
determine a selected frequency at which a peak occurs in a frequency spectrum of the reflection signal;
determine a ground signal intensity at the selected frequency from a ground signal spectrum stored in memory;
estimate, from the ground signal intensity and the peak in the frequency spectrum, an amount of the ground signal in the reflection from the object at a range corresponding to the selected frequency, and
identify the object at the range for tracking when the amount is less than a selected noise threshold.

16. The vehicle of claim 15, wherein the processor is further configured to form a ratio of the ground signal at the determined range to a total reflected signal at the determined range.

17. The vehicle of claim 16, wherein forming the ratio further comprises:
correlating the ground signal at the selected frequency with the peak of the reflected signal at the selected frequency to obtain a correlation value;
determining a total power at the selected frequency; and
forming the ratio by comparing the correlation value at the selected frequency to the total power at the selected frequency.

18. The vehicle of claim 17, wherein the processor is further configured to disregard the reflection from the object as noise when the ratio is greater than a selected noise threshold.

19. The vehicle of claim 17, wherein the processor is further configured to track the object when the ratio is less than a selected noise threshold.

20. The vehicle of claim 15, further comprising an autonomous driving system that receives the tracking of the object from the processer and maneuvers the vehicle with respect to the tracked object based on a parameter of the object determined from the reflected signal.

* * * * *